(12) United States Patent
Benson

(10) Patent No.: US 8,775,794 B2
(45) Date of Patent: Jul. 8, 2014

(54) SYSTEM AND METHOD FOR END TO END ENCRYPTION

(75) Inventor: Glenn Benson, Newton, MA (US)

(73) Assignee: JPMorgan Chase Bank, N.A., New York, NY (US)

( * ) Notice: Subject to any disclaimer, the term of this patent is extended or adjusted under 35 U.S.C. 154(b) by 201 days.

(21) Appl. No.: 13/168,148

(22) Filed: Jun. 24, 2011

(65) Prior Publication Data

US 2012/0131331 A1    May 24, 2012

Related U.S. Application Data

(60) Provisional application No. 61/413,858, filed on Nov. 15, 2010.

(51) Int. Cl.
*H04L 9/32*       (2006.01)
*H04L 29/06*      (2006.01)

(52) U.S. Cl.
USPC ........... 713/155; 713/159; 713/169; 713/189; 380/28; 380/30; 380/281

(58) Field of Classification Search
USPC ........... 713/155, 168, 171; 380/273, 277, 278
See application file for complete search history.

(56) References Cited

U.S. PATENT DOCUMENTS

| | | |
|---|---|---|
| 4,200,770 A | 4/1980 | Hellman et al. |
| 4,405,829 A | 9/1983 | Rivest et al. |
| 4,453,074 A | 6/1984 | Weinstein |
| 4,471,164 A | 9/1984 | Henry |
| 4,661,658 A | 4/1987 | Matyas |
| 4,890,324 A | 12/1989 | Jansen |
| 5,161,244 A | 11/1992 | Maurer |
| 5,231,668 A | 7/1993 | Kravitz |
| 5,532,920 A | 7/1996 | Hartrick et al. |
| 5,657,390 A | 8/1997 | Elgamal et al. |

(Continued)

FOREIGN PATENT DOCUMENTS

| | | |
|---|---|---|
| WO | 0018060 | 3/2000 |
| WO | 2005101975 | 11/2005 |
| WO | 2006060370 | 6/2006 |

OTHER PUBLICATIONS http://www.dvs.tu-darmstadt.de/publications/PhDs/diss_Kilian-Kehr02.pdf "Mobile Security with Smartcards"—Apr. 2012, Roger Kilian-Kehr Usenix.*

(Continued)

*Primary Examiner* — Randy Scott
(74) *Attorney, Agent, or Firm* — Hunton & Williams LLP

(57) ABSTRACT

Systems and methods for end-to-end encryption are disclosed. According to one embodiment, a method for device registration includes (1) an application executed by a computer processor receiving a user password from a user; (2) using the computer processor, the application combining the user password and a password extension; (3) using the computer processor, the application cryptographically processing the combined user password and password extension, resulting cryptographic public information; and (4) providing the cryptographic public information to a server. The user password is not provided to the server. In another embodiment, a method for user authentication includes (1) using a computer processor, receiving a login page from a server; (2) sending a Hash-based Message Authentication Code to the server; and (3) receiving an authentication from the server. In one embodiment, the login page may include a transkey and a value B.

21 Claims, 5 Drawing Sheets

(56) References Cited

U.S. PATENT DOCUMENTS

| | | |
|---|---|---|
| 5,787,156 A | 7/1998 | Katz |
| 5,825,890 A | 10/1998 | Elgamal et al. |
| 5,892,900 A | 4/1999 | Ginter et al. |
| 5,898,762 A | 4/1999 | Katz |
| 5,917,893 A | 6/1999 | Katz |
| 5,924,094 A | 7/1999 | Sutter |
| 6,005,943 A | 12/1999 | Cohen et al. |
| 6,105,006 A | 8/2000 | Davis et al. |
| 6,112,181 A | 8/2000 | Shear et al. |
| 6,253,193 B1 | 6/2001 | Ginter et al. |
| 6,535,980 B1 | 3/2003 | Kumar et al. |
| 6,640,304 B2 | 10/2003 | Ginter et al. |
| 6,820,202 B1 | 11/2004 | Wheeler et al. |
| 6,938,156 B2 | 8/2005 | Wheeler et al. |
| 6,950,940 B2 | 9/2005 | Wheeler et al. |
| 6,978,369 B2 | 12/2005 | Wheeler et al. |
| 7,051,199 B1 | 5/2006 | Berson et al. |
| 7,069,434 B1 | 6/2006 | Ilnicki et al. |
| 7,133,846 B1 | 11/2006 | Ginter et al. |
| 7,167,844 B1 | 1/2007 | Leong et al. |
| 7,266,705 B2 | 9/2007 | Peck et al. |
| 7,277,870 B2 | 10/2007 | Mourad et al. |
| 7,440,923 B1 | 10/2008 | Compiano |
| 7,853,600 B2 | 12/2010 | Herz et al. |
| 2002/0031230 A1 | 3/2002 | Sweet et al. |
| 2002/0048369 A1 | 4/2002 | Ginter et al. |
| 2002/0084321 A1 | 7/2002 | Martens et al. |
| 2003/0158960 A1 | 8/2003 | Engberg |
| 2003/0163431 A1 | 8/2003 | Ginter et al. |
| 2003/0191719 A1 | 10/2003 | Ginter et al. |
| 2004/0010699 A1 | 1/2004 | Shao et al. |
| 2004/0022390 A1* | 2/2004 | McDonald et al. ........... 380/277 |
| 2005/0114367 A1 | 5/2005 | Serebrennikov |
| 2006/0047573 A1 | 3/2006 | Mitchell et al. |
| 2007/0033392 A1* | 2/2007 | Ganesan et al. ............. 713/155 |
| 2007/0067629 A1 | 3/2007 | Mackenzie et al. |
| 2007/0186095 A1* | 8/2007 | Ganesan et al. ............. 713/155 |
| 2009/0049297 A1* | 2/2009 | Omernick et al. ........... 713/168 |
| 2010/0205443 A1 | 8/2010 | Zhao et al. |
| 2011/0112901 A1 | 5/2011 | Fried et al. |

OTHER PUBLICATIONS http://www.teco.edu/~posegga/papers/ismartcard.pdf "Smart Cards in Interaction: Towards Trustworthy Digital Signatures"—Kilian-Kehr et al, Nov. 2002.*

Bennet Yee, Using Secure Coprocessors, Thesis Committee, School of Computer Science, Carnegie Mellon University, May 1994, 104 pages.

James E. Youll, Peer to Peer Transactions in Agent-Mediated Electronic Commerce, Thesis, Massachusetts Institute of Technology, Aug. 10, 2001, 172 pages.

Roger Kilian-Kehr, Mobile Security With Smartcards, Dissertation, Von Fachbereich Informatik der Technischen Universitat Darmstadt, Apr. 8, 2002, 169 pages.

* cited by examiner

SYSTEM AND METHOD FOR END TO END ENCRYPTION

RELATED APPLICATION

This patent application is related to U.S. Provisional Patent Application Ser. No. 61/413,858 filed Nov. 15, 2010, the disclosure of which is incorporated by reference in its entirety.

BACKGROUND OF THE INVENTION

1. Field of the Invention

The present invention generally relates to secure transmission of information, and, more particularly, to a system and method for end-to-end encryption.

2. Description of the Related Art

When a user logs on to a server via an application on a client computer, the user's password is normally submitted to the server. Based on whether or not the submitted password is correct, the server either grants or denies access.

SUMMARY OF THE INVENTION

Systems and methods for end-to-end encryption are disclosed. According to one embodiment, a method for device registration includes (1) an application executed by a computer processor receiving a user password from a user; (2) using the computer processor, the application combining the user password and a password extension; (3) using the computer processor, the application cryptographically processing the combined user password and password extension, resulting cryptographic public information; and (4) providing the cryptographic public information to a server. The user password is not provided to the server.

In one embodiment, the user password and the password extension may be concatenated.

In one embodiment, the password extension is a random number generated by the computer processor.

In one embodiment, the password extension may be generated by the computer processor and may be related to one or more of a time, a location, an internal CPU temperature, a level of CPU usage, a bus voltage, a background radiation level, and a background noise level.

In one embodiment, the password extension is a BASE 64-encoded 256-bit number.

In one embodiment, the Diffie-Hellman Key Agreement protocol may be used to cryptographically process the concatenated password and password extension. In another embodiment, the Menezes-Qu-Vanstone protocol may be used to cryptographically process the concatenated password and password extension.

In one embodiment, the password extension is stored on an external device. The external device may be a USB token, a wireless-enabled device, etc.

In another embodiment, a method for user authentication includes (1) using a computer processor, receiving a login page from a server; (2) sending a Hash-based Message Authentication Code to the server; and (3) receiving an authentication from the server. In one embodiment, the login page may include a transkey and a value B.

In one embodiment, the Hash-based Message Authentication Code may be HMAC(K,(UserID, Transkey, OTP)), where K is equal to $B^a$ mod p, a is a concatenation of a password and a password extension, the UserID is a user identifier; and the OTP is a one time password.

In one embodiment, the method may further include verifying the authenticity of the server. This may include receiving a server value RESP from the server, the server value RESP equal to HMAC(K,(UserID, transkey, OTP, timestamp+1)); using the computer processor, calculating a client value RESP equal to HMAC(K,(UserID, transkey, OTP, timestamp+1)); and verifying that the server value RESP against the client value RESP.

In another embodiment, a method for user authentication includes (1) a server providing a login page to a client device; (2) a server receiving a Hash-based Message Authentication Code from the client device, the Hash-based Message Authentication Code comprising a UserID and a one time password; (3) retrieving a stored cryptographic public information and a stored one time password associated with the UserID; (4) using the computer processor, the server determining a client value K; and (5) using the computer processor, the server validating the client value K against a server value K.

In one embodiment, the step of providing a login page to a client device may include using a computer processor, the server generating a random number b; using the computer processor, the server calculating a value B using random number b, wherein the value B is calculated using the equation $g^b$ mod p, and wherein g is a primitive root, and p is a prime number; using the computer processor, the server generating a transkey; and using the computer processor, the server generating a login page containing the value B and the transkey. In one embodiment the server does receive a user password.

In one embodiment, the Hash-based Message Authentication Code may be HMAC(K,(UserID, Transkey, one time password)), where K is equal to $B^a$ mod p, and a is a concatenation of a password and a password extension, and the UserID is a user identifier.

In one embodiment, the transkey may be generated using the equation transkey={b}gk where gk is a global encryption key.

In one embodiment, the server may determine the client value K from using the equation $K=B^a$ mod p.

In one embodiment, the server may reject the authentication request if the server does not validate the value K.

In one embodiment, the method further includes a second server receiving the Hash-based Message Authentication Code from the client device, the Hash-based Message Authentication Code comprising a UserID and a one time password; the second server retrieving a second stored cryptographic public information and a stored one time password associated with the UserID; using the computer processor, the second server determining a second client value K; and using the computer processor, the second server validating the second client value K against a second server value K.

In another embodiment, a method for user authentication includes (1) receiving, at a client device, a login page containing a value B, and a transkey; (2) receiving, from a user, a user password; (3) using a computer processor, a client application retrieving, from a memory, a stored password extension; (4) using the computer processor, the client application combining the password and the number; (5) using the computer processor, the client application cryptographically processing the combined password and number, resulting cryptographic public information; (6) using the computer processor, the client application generating a client value K based on the cryptographic public information; (7) using the computer processor, the client application cryptographically processing the UserID, transkey, and a token value with the value K; and (8) transmitting the cryptographically processed UserID, transkey, and token value to the server.

In one embodiment, the stored password extension may be retrieved from an external device.

In one embodiment, the client application may request the login page from the server.

In one embodiment, the client application may verify an identity of the server before requesting the login page.

In one embodiment, the client application may verify an identity of the server before transmitting the cryptographically processed UserID, transkey, and token value to the server.

In one embodiment, the method may further include receiving a server value RESP from the server, the server value RESP equal to HMAC(K,(UserID, transkey, OTP, timestamp+1)); using the computer processor, calculating a client value RESP equal to HMAC(K,(UserID, transkey, OTP, timestamp+1)); and verifying that the server value RESP against the client value RESP. The connection with the server may be terminated if the server value RESP and the client value RESP are different.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
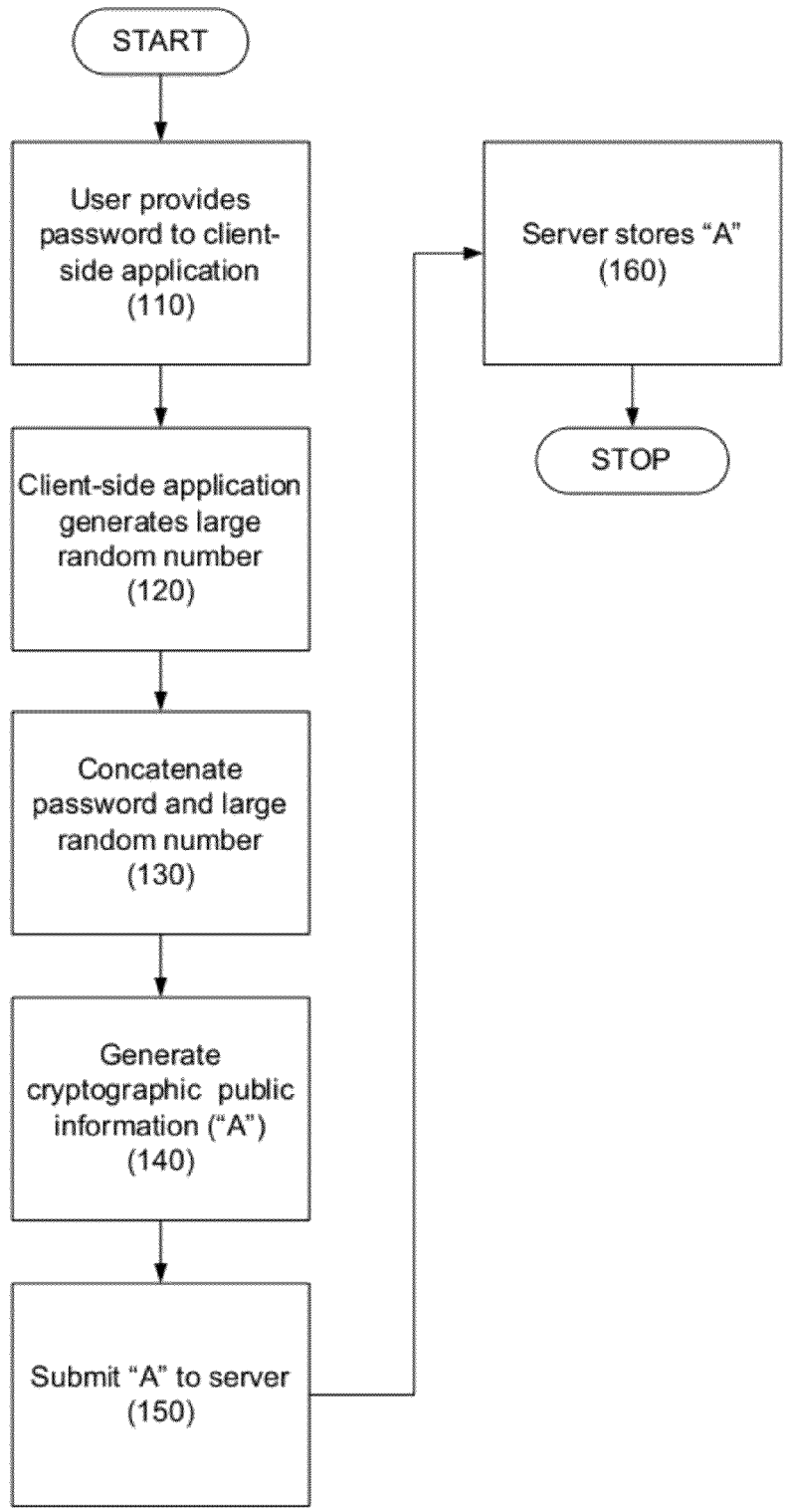
FIG. 1 is a flowchart depicting a method for device registration using end-to-end encryption according to one embodiment of the invention.

Several embodiments of the present invention and their advantages may be understood by referring to FIGS. 1-5, wherein like reference numerals refer to like elements.

The disclosure of U.S. Pat. No. 4,200,770 is incorporated by reference in its entirety. Further, the disclosures of U.S. patent application Ser. Nos. 60/830,672 and 11/610,289 are also incorporated by reference in their entireties.

Static passwords are troublesome in that they can be leaked to an unauthorized party and used at a future time chosen by the adversary. Even though passwords can be encrypted in transit, the possibility exists of an insider attack whereby the insider places a debugger or a "logic bomb" into the server's software that grabs the decrypted password and then uses that password for illicit purposes remains.

In general, the invention uses end-to-end encryption with cryptographic technology to obtain indirect evidence that the user has the correct static password and/or is using an authorized device. In one embodiment, this approach uses a form of asymmetric cryptography. The user has static private information, and the server has associated public information. The user never provides the private information to the server at any point in the registration, authentication, or any other process. Instead, the user provides public information to the server from which cryptographic protection mechanisms prohibit the server from using the public information to derive the private information. As a result, the server is not subject to an attack which yields the static password because the server does not have information that could be divulged to an unauthorized party in an attempt to discover the password by obtaining access to information on the server. So, even if an adversary were to obtain the contents of all memory, non-volatile storage, documents, and other information held by the server, the adversary would not be able to discover the user's password.

In one embodiment, an external device, such as a USB device, may be used to provide a data input source for, for example, the user to enter a password. Other client-side protections may be used as necessary and/or desired.

In one embodiment, the Diffie-Hellman Key Agreement protocol may be used. In another embodiment, the Menezes-Qu-Vanstone ("MQV") protocol may be used. These protocols were standardized within the financial services community in the document American National Standard for Financial Services, X9.42-2003, "Public Key Cryptography for the Financial Services Industry: Agreement of Symmetric Keys Using Discrete Logarithm Cryptography", Nov. 19, 2003. This document is incorporated by reference in its entirety.

Other suitable protocols may be used as necessary and/or desired.

These protocols provide alternative vehicles to compute a shared symmetric key used throughout the duration of a session, a portion of a session, or after the session completes. For example, in one embodiment, the client computes the symmetric key using the client's password and additional information, while the server computes the same symmetric key using information from which one cannot reverse engineer to identify the password. Once the client and server both compute the same symmetric key, the client and server may communicate to prove that the client knows the symmetric key. This provides indirect evidence that the user must have known his or her password, because otherwise, the client software would compute a symmetric key that would not match the server's computed symmetric key.

In general, the process may involve the user first creating a password and deriving public registration information from that password. The user then sends that public registration information to the server.

When the user attempts to gain access by logging into the server, an application running on the client computer and the server may each generate fresh information to protect against a replay attack (e.g., when an adversary intercepts data and uses that data to obtain access to the server). The application and the server may both exchange information, and each may derive a symmetric key. The application derives the symmetric key from its private password; and the server derives the same session key from the public registration information.

Referring to FIG. 1, a method for password registration using end-to-end encryption is provided. This method may be used whenever the user wishes to use a new password (e.g., the user forgot the old password, or the user changes the password periodically). In step 110, the user may provide a password to an application that may be running on a client device. In one embodiment, the client device may be a desktop computer, a notebook computer, a netbook computer, a tablet computer, a PDA, a mobile phone, a video game console, a set top box, an eReader, etc.

In one embodiment, during the registration process, or whenever the user changes his or her password, changes devices, etc. the password entered by the user may be checked with client-side software to make sure that it is not a prohibited password. In one embodiment, prohibited passwords may include simple passwords (e.g., 123456); offensive/vulgar words, passwords fewer than a certain number of characters, etc. In one embodiment, additional restrictions may be placed on the password, including requiring a lower case letter, an upper case letter, and a number as part of the password.

In one embodiment, in order to avoid transmitting the user's password to the server, the password check must be executed by the user's client side software as opposed to the server.

In step 120, the application may provide a value. In one embodiment, the value may be a Large Password Extension, or "LPE". In one embodiment, the LPE may be a random number that may be generated by the application. In another embodiment, the LPE may be a fixed number that may be associated with, for example, the device. In another embodiment, the LPE may be a value produced by a pseudo random number generator. For example, the LPE may be generated based on a relationship to time, a location, an internal CPU temperature, CPU usage, a bus voltage, background radiation/noise, a combination of any of the above, etc.

The LPE is preferably a large number. In one embodiment, at least a BASE 64-encoded 256-bit number may be used. The LPE may be a base 10 number, a hexadecimal number, a binary number, base 64 number, etc. The client may store the LPE in a file on the client device's non-volatile memory, but may not disclose the LPE to the server. In another embodiment, the client may store the LPE on a USB token. In another embodiment, the client may store the LPE on a token connected to the client's machine through wireless technology, for example, Bluetooth. In another embodiment, the client may store the LPE on a fixed drive that may be directly attached to the client's computer. In another embodiment, the LPE may be stored on a fixed drive that may be connected to the client via a network. In another environment, the LPE may be stored on the server.

Other lengths and/or types of LPEs may be used as necessary and/or desired.

In one embodiment, more than one LPE may be stored or associated with the client device. In one embodiment, the LPEs may be rotated through and may be tracked using a counter which may be maintained by both the client device and by the server. In another embodiment, the LPEs may be selected based on, for example, a time of day, a date, a month, etc. Other methods of selecting a LPE may be used as necessary and/or desired.

In one embodiment, step 120 may be skipped. In another embodiment, the LPE may be a non-secret constant. In such cases, however, the password may be more susceptible to a dictionary attack should an adversary be able to access the server's memory as the entropy associated with the LPE would not be present.

In step 130, the application may combine the password entered by the user and the LPE. In one embodiment, the password and the LPE may be concatenated. In another embodiment, step 130 may be implemented as the result of a message digest algorithm computed over the password and the LPE, e.g., SHA-256(password,LPE) as opposed to a simple concatenation.

In step 140, the application may generate cryptographic public registration information, or value "A". This information may be a cryptographically-processed version of the result of step 130, e.g., the combination of the password and LPE. In one embodiment, the Diffie-Hellman Key Agreement protocol may be used. In another embodiment, the Menezes-Qu-Vanstone ("MQV") protocol may be used. Other protocols may be used as necessary and/or desired. Value "A" is used on multiple sessions until the user sets up a new password or LPE.

In one embodiment, A may be defined as $A = g^a$ mod p (g raised to the power "a" modulo p)

where a=SHA256(password, LPE)

In another embodiment a=concatenate(password, LPE)

In step 150, the application may submit the public registration information (value "A") to the server.

In one embodiment, if more than one LPE is used, the application may generate multiple values for value "A" and submit this to the server. In one embodiment, the application may associate each value "A" with a counter value.

In step 160, the server may store the public registration information (value "A"). In one embodiment, the public registration information may be stored with other user information including, for example, a user identifier (UserID), a registration number, a device number, an index used to assist in credential validation, etc. This information may be stored in a database, referred to herein as a Registration Database. When presented with a UserID, the Registration Database may return other information associated with that UserID, such as the registered value "A". The user may request updates to the information stored in the Registration Database. For example, when the user changes his or her password, the user calculates and submits a new value "A" to the Registration Database. In one embodiment, the client and server machines are the same. Thus, the registration database may reside in the client machine If an adversary were to break into the machine with the intention of stealing the user's password from the machine's password database, then the adversary would only discover the value "A".

In one embodiment, because the public registration information (value "A") requires the LPE stored on the user's device, the user must separately register each device he or she wishes to use, and the server may store separate proving material for each device. In one embodiment, the user may use a different password with each device (e.g., one password for a laptop, and a different password for a mobile device), or may use the same password across multiple devices. In one embodiment, the user may employ the same password on each device, and may use a USB token, wireless token, etc. that stores the LPE as a portable device. So, regardless of the device to which the user employs, the LPE is available on the portable medium holding the LPE.

In another embodiment, the server may store only the most recent public registration information (value "A"). Thus, the user may not be able to easily login from multiple different devices. Rather, if the user changes devices, he or she must register that device even if the device had been previously registered.

In another embodiment, the server may use conventional computer security methods to prevent unauthorized disclosure of the public registration information A. For example, access control lists may be used to control access to the server. The access control list explains which processes may access registration information A. The access control list may enforce the concept of least privileges rendering information A as not accessible from any party or process which does not have a need-to-know.

In another embodiment, independent authentication may be used to verify the identity of the person attempting to register or change a password. U.S. patent application Ser. Nos. 60/830,672 and 11/610,289, which are incorporated by reference in their entireties, disclose an example of authentication using a different communication channel, or band, from that being used by the user to register or change the password. For example, the server may verify the identity of the user by transmitting a SMS message including, for example, a number, to a registered mobile device. The user may then be required to enter the number transmitted in the SMS to the login page. In one embodiment, the number transmitted through SMS, e-mail, or another channel is new each time the user registers a new device and may only be used once. In one embodiment, a server may store the LPE and may send the LPE to the client by SMS.

Other communication channels, such as email, voice (e.g., VRU), facsimile, etc. may be used for such verification as necessary and/or desired.

In another embodiment, the user may be required to enter a one-time password, or OTP, in order to register or change a password.

Figure 2:
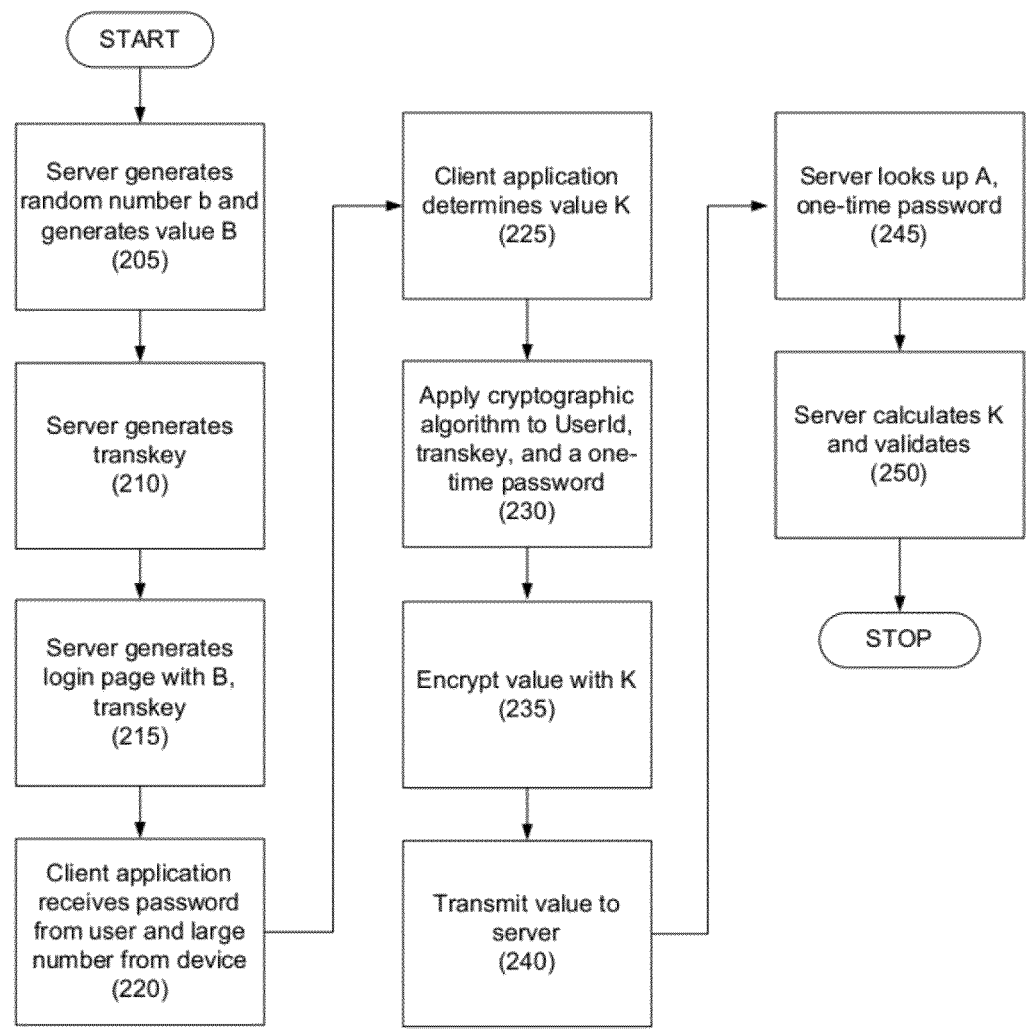
FIG. 2 is a flowchart depicting a method for end-to-end encryption according to one embodiment of the invention.

Referring to FIG. 2, a method for end-to-end encryption according to one embodiment of the invention is illustrated.

In step 205, the server may generate a random number, b. In one embodiment, the value "b" may be a 256-bit BASE64-encoded random value. In another embodiment, the value "b" may be created using a pseudo-random number generator.

The server may apply a cryptographic algorithm to value "b" to compute a value "B." In one embodiment, the Diffie-Hellman Key Agreement protocol may be used. In another embodiment, the Menezes-Qu-Vanstone (MQV) protocol may be used. Values "b" and "B" may be used only in the session.

In one embodiment, B may be defined as:

$$B = g^b \bmod p$$

where b is a random number that may be created by the server for each login, i.e., each time the server receives a login request, the server generates a new value "b";

g is a number called the "generator" or "primitive root"; and p is a prime number created by the server.

The values for "g" and "p" may be created once, and may be used for all users. In one embodiment, the values "g" and "p" may be hardcoded into the client and server software, and are therefore automatically distributed whenever the software executes. In another embodiment, values for "g" and/or "p" may be recreated for different users When the client calculates the value "A", and the server calculates value "B", and both calculations reference values "g" and "p". Both parties must reference the same value for "g", and both parties must reference the same value for "p".

The values for "g" and "p" may be distributed to the user during the password creation/change process, such as before step 140. They may also change each time that a user requests to change a password or number. In one embodiment, the values "g" and "p" may change periodically, such as, for example, on a monthly basis, a quarterly basis, whenever there is a new code release, etc.

In step 210, the server may generate a transkey. In one embodiment, the transkey is an identifier used by the server to help maintain system state to manage the random value "b". The transkey may be an optimization which bypasses the need for the server to retain b within its volatile state.

For example, the transkey may be defined as:

transkey={b}gk where gk is a global encryption key that may be known only to the server. The notation {x}y indicates that the value x is encrypted using the key y, where the encryption algorithm is symmetric. Example symmetric algorithms are DES, Triple-DES, and AES. Using the AES 256 algorithm, then transkey={b}gk means that the value b is encrypted using the AES 256 algorithm using the 256-bit key gk. Note that gk and g are unrelated.

In one embodiment, the server does not need to maintain a database of session states for each client.

In step 215, the server may generate a login page for the client device. An example of such a login page is provided in FIG. 4.

Figure 4:
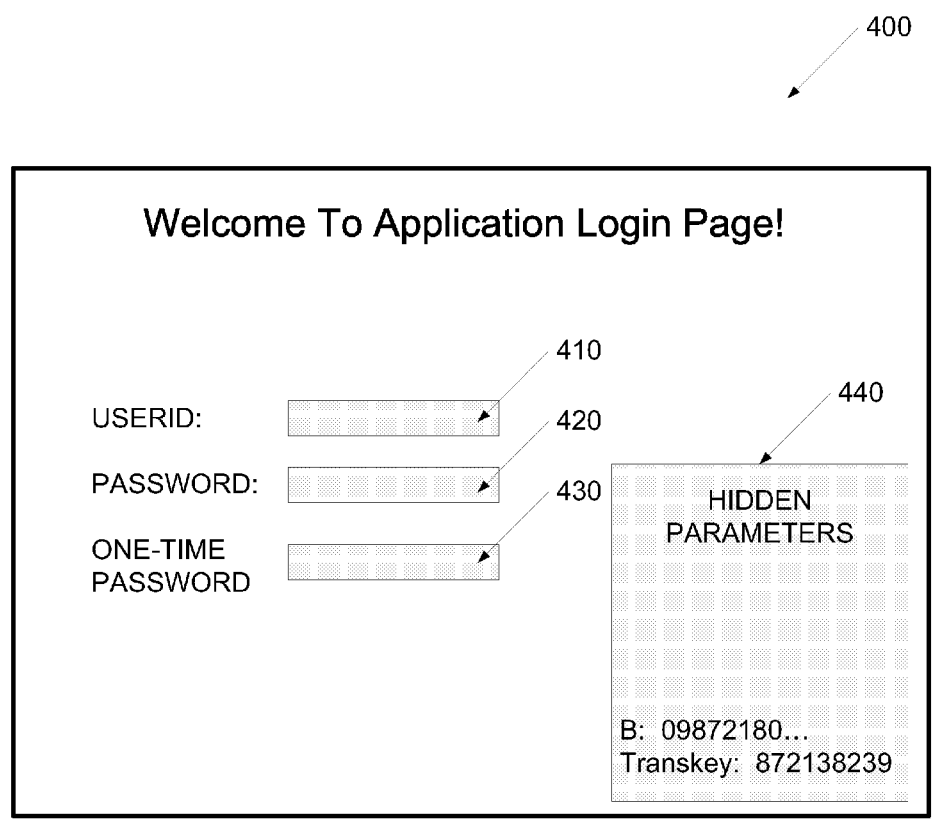
FIG. 4 is an example of a login screen according to one embodiment of the invention.

In FIG. 4, login screen 400 may include fields for the user to enter UserID 410, password 420, one-time password ("OTP") 430, and a timestamp. In one embodiment, hidden parameters 440 may be passed to the client device on the login page, and resubmitted back to the server along with fields 410, 420, and 430 when the client presses the return key or presses submit button 450. In one embodiment, hidden parameters 440 provide information to the client-side software are not be visible to the user. While the user may be able to discover the value(s) of hidden parameters 440, most users do not care about the values because the values are only used by the client software.

In one embodiment, hidden parameters 440 may include the value "B", the value for the transkey, and values "g" and "p" if needed.

In one embodiment, the server may further provide an application, such as an applet, to the client device. The user id and/or the value "K" are not included on the login page.

Referring again to FIG. 2, in step 220, the client application may read the password and the one-time password from the user's input, the LPE, and the value "B" provided by the server as part of the login page.

In one embodiment, the LPE may be retrieved from the client device's memory. In another embodiment, the LPE may be retrieved from external storage, such as a USB token, a flash drive, a network location, etc. In still another embodiment, the LPE may be retrieved from a wireless-enabled device, such as a token.

The client device may also read the LPE from another source. For example, if the client device is a mobile device, it may optically-scan the LPE from a source (e.g., a paper, a photograph, a computer screen, etc.) using QR codes, bar codes, etc. In another embodiment, the client device may receive the LPE by audio (e.g., Morse code). Other mechanisms and techniques for transmission of a LPE to a client device may be used as necessary and/or desired.

In step 225, the client application may determine the value of "K". In one embodiment, the application may apply a cryptographic transformation of the value "B" obtained from the login page, and the password/large number to discover value K.

In one embodiment, the value "K" may be determined as follows using B, a, and the known value for "p":

$$K = B^a \bmod p$$

wherein a has the same value as was produced in step 130. In one embodiment a equals the concatenation of the password and the LPE. In another embodiment a=SHA-256(password, LPE).

In step 230, the client application may apply a cryptographic algorithm to the UserID, the transkey, and an OTP. In one embodiment, the secure hash algorithm, such as SHA-1, SHA-2, SHA-256 may be applied.

In step 235, the message may be cryptographically processed with value "K". For example, the value may be a Hash-based Message Authentication Code, or HMAC, computed with the value "K" using the SHA-256 message digest algorithm over the values (UserID, transkey, OTP, timestamp). See Network Working Group Request for Comments 2104-HMAC: Keyed-Hashing for Message Authentication, February 1997, the disclosure of which is incorporated by reference in its entirety. The notation HMAC(K,(M)) is used herein to denote an HMAC of message M with key K. In one embodiment the OTP has one-time semantics. In other words, once the server validates a particular OTP value for the user, the server fails to accept the same OTP value from the same user within a particular time window. The RSA SecurID system is an example OTP with one-time semantics.

In step 240, the client application may provide the HMAC to the server. In one embodiment, the HMAC value may be placed into a hidden form field and submitted to the server.

In one embodiment, instead of using a HMAC, the Advanced Encryption Standard (AES) in Cipher Block Chaining (CBC) mode may be used with the value "K" as the encryption key. The client may send AES (UserID, transkey, OTP, timestamp), transkey, OTP, timestamp to the server with the value "K" as the encryption key. In one embodiment, the client may generate the timestamp. In another embodiment, the client may copy the timestamp from a timestamp provided by the server on the login page. In one embodiment, the server validates that the timestamp is not older than a threshold value, e.g., 5 minutes. In one embodiment, the server validates that the same OTP was not previously provided by the same UserID within a threshold time for any purpose, e.g., 10 minutes. If the server does not validate any credential(s), then the server fails the login and does not initiate the session.

The server may validate the submission. In one embodiment, in step 245, the server may look up the UserID in the registration database to discover A. The server may then validate the OTP to ensure its correctness against expectations.

In step 250, the server may then calculate the value "K" from the submission. In one embodiment, the value "K" may be calculated as follows:

$$K = A^b \bmod p$$

In one embodiment, the server had stored value "b" in a session variable when the server created it before providing the login page, and then consults this session variable to remember the value "b" when needed. In another embodiment, the server accepts from the user transkey which was provided as a hidden parameter on the login page. Then the server employs its secret key, gk, which is unknown to the client. The server uses gk to decrypt, thereby yielding the value "b". The server then views the value "A" that the server received from the client at password registration time, value "b" that the server discovered by decrypting, and value "p" which is a well-known global value to compute the value "K".

If the validation is correct, the server may augment security of the login by validating other authentication credential checks, for example the device registration, IP address filter, etc.

In still another embodiment, the server may validate an IP address against a registered IP address for the client device. In another embodiment, the server may validate a geographical location of the client device against a registered geographical location for the client device. Other ways for verifying the identity and/or location of the client device may be used as necessary and/or desired.

In one embodiment, the server may rely on the one-time semantics of the OTP to protect against playback attacks. The one-time semantics of the OTP may prevent the server from accepting exactly the same OTP from the client twice within a certain time period. If the server receives exactly the same OTP more than once within a certain time period, the server may consider the authentication event to be unsuccessful. Whenever the server fails any aspect of authentication, the server terminates the login request immediately without creating a session for a client.

In one embodiment, if all authentication checks succeed, then the server provides a cookie, such as a Single Sign-On (e.g., SiteMinder) cookie, to the user. Otherwise, the server executes the three-tries-and-out rule, whereby the client may be "locked out" upon three unsuccessful login attempts.

The process is not vulnerable to a dictionary attack launched by an insider who has access to value "A" stored on the server for any user. The object of a dictionary attack is to reverse engineer the value "a" starting with the value "A". Once the adversary discovers value "a", then the adversary can further attack to discover the password. Since value "a" can be a message digest of the user's password combined with a large random number (i.e., LPE) stored on the user's machine (or some other combination such as a concatenation of the user's password and large random number), the adversary must overcome too much entropy to successfully launch a dictionary attack to discover the value "a". For example, if the random number were not used, then the adversary could generate every password of less than 9 or 10 characters, and then generate every corresponding value "A" to see which was registered. By adding the entropy of the LPE, such a dictionary attack cannot be made efficiently.

In one embodiment, the LPE is NULL. In this case, an adversary may potentially successfully execute a dictionary attack. The adversary may not, however, efficiently execute a dictionary attack against all users simultaneously. Rather, suppose an adversary were to break into the server and capture each value "A" registered for every user. In order to gain an advantage, the adversary must launch an individual dictionary attack against each value "A", as opposed to launching a single attack on all the downloaded items in order to completely compromise the system in a single attack. In one embodiment the LPE may be the UserID. This forces each user to have a different LPE while permitting the user to remember the LPE and enter it on each login.

Figure 3:
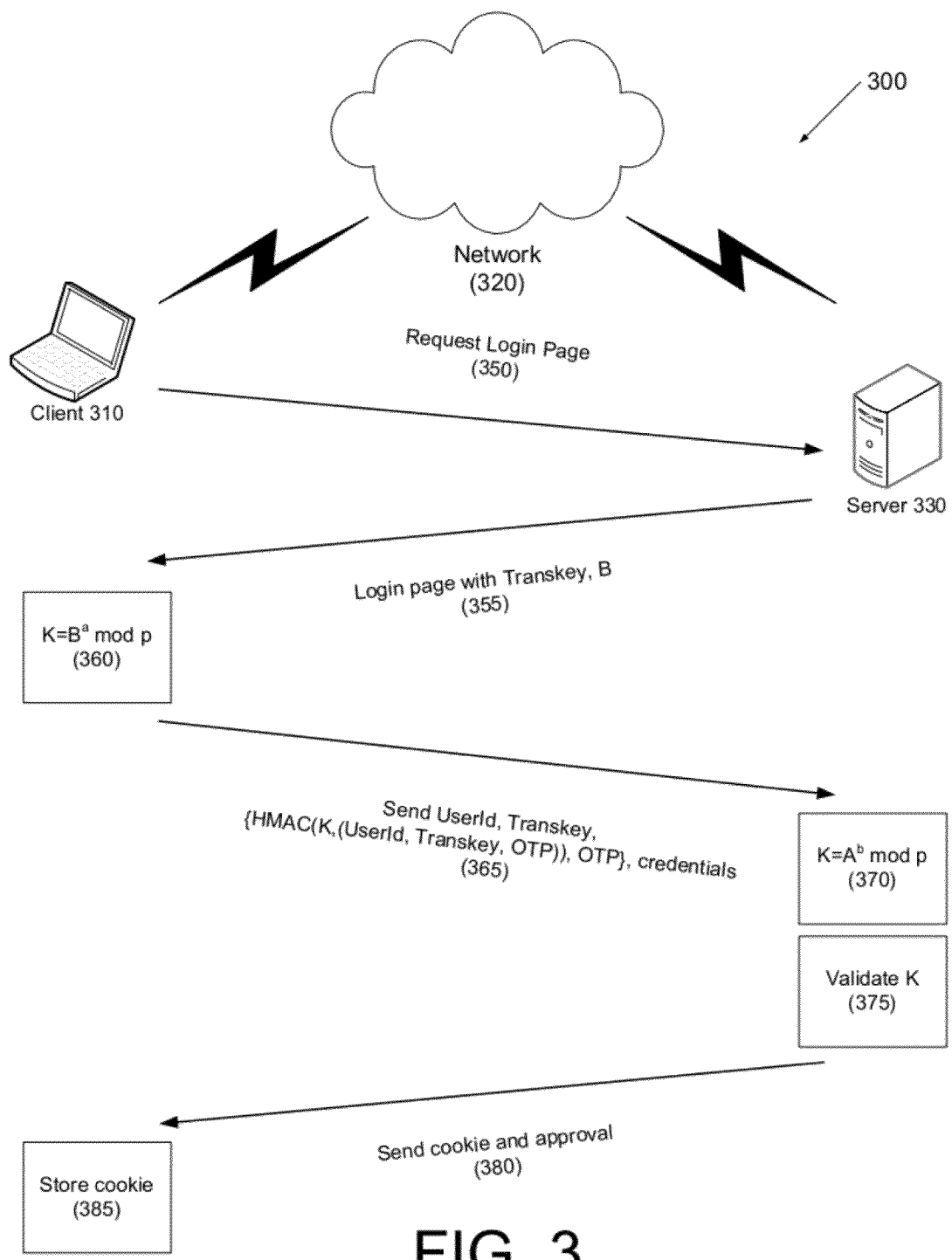
FIG. 3 is a block diagram of a system for end-to-end encryption according to one embodiment of the invention.

Referring to FIG. 3, system 300 includes client device 310, network 320, and server 330. Client device 310 may be a desktop computer, a notebook computer, a netbook computer, a tablet computer, a PDA, a mobile phone, a video game console, a set top box, an eReader, etc. Network 320 may be any suitable communications network, including wired and wireless networks, the Internet, intranets, WANs, LANS, etc. Server 330 may be any suitable server, and may include a memory that stores the registration and logon processes, and a processor that executes the processes. In one embodiment, the client device 310 and the server 330 may be the same computer. This may result in a superior method of storing passwords on a computer.

In another embodiment, a client may authenticate with more than one server. The means of authentication at each server may be identical. The client may only, however, registers the value "A" with one server. The server then synchronizes with the second server by sending the value "A" to the second server. From the client's perspective, the client may login to both servers, but only register the value "A" at one server. The advantage is that the two servers can execute the synchronization protocol with no concern of the possibility that they may accidentally or maliciously leak the user's password. Since neither server knows or can derive the user's password, the possibility of unauthorized password leakage is addressed.

In one embodiment, system 300 may further include token 315, which may be a USB token, wireless token, etc. In one embodiment, token 315 may store the LPE. In another embodiment, token 315 may provide other functionality as discussed below.

An illustration of the process according to one embodiment is illustrated in FIG. 3. In step 350, client device 310 sends a request to view the login page to server 330. In step 355, server 360 returns a login page and the transkey and value "B" (described above). The server 360 may create a new transkey and value "B" immediately before sending the response to the client with the login page. In step 360, client device 310 calculates the value "K".

In step 365, client device 310 sends the UserID, Transkey, OTP, HMAC(K,(UserID, Transkey, OTP)), and any other credentials to server 330.

In step 370, server 330 may receive the UserID that the client sent in 365 in its Registration Database to identify the value "A" for that user. Server 330 may calculate the value "K", and, in step 375, server 330 validates the value "K".

If the value "K" and all other login credentials for the user (e.g., OTP) are validated, in step 380, server 330 may establish a secured session for that user. For example, server 330 may download information (e.g., encrypted random number) to be placed in the client computer's non-volatile storage (memory). On each subsequent request from the client, the client sends the information (e.g., encrypted random number). Server 330 may only accept a subsequent request, if the information (e.g., encrypted random number) is as expected for that session. In one embodiment, this encrypted random number exists in the form of a cookie to client device 310. In step 385 client device 310 may store this cookie.

In one embodiment, the client may provide additional protection to ensure that the server is genuine and is not an unauthorized server that is pretending to grant the user's login request. For example, if all of the conditions pass, and the server accepts the login request, then the server may respond with the following value:

RESP=HMAC($K$,(UserID,transkey,OTP,timestamp+1))

After receiving RESP, the client may recalculate the HMAC using values that the client remembered from its login request and login page: UserID, transkey, OTP, timestamp (where the client knows to add one to the timestamp when validating RESP. If the value RESP calculated by the client matches the value RESP provided by the server, the client can confirm that the server knows the value "K" and the server cannot calculate the value "K" unless the server also knows the value "A". Thus, the client knows the server's identity provided that the client provided the value "A" to the right server, and the server maintains the secrecy of the value "A".

If the client-calculated RESP does not match the value RESP provided by the server, then the client may terminate the session even though the server granted the login request. In one embodiment, the client may automatically terminate the connection. In another embodiment, the client may warn the user of the discrepancy. The user may choose to proceed, or may terminate the connection.

In one embodiment, the client may employ token 315, which may be a cryptographically-enhanced USB token. The token 315 may interface with client device 310. In this embodiment, token 315 may have an interface that generates the LPE from the user, but has no interface that allows the LPE to be exported off of token 315. In this way, token 315 ensures the secrecy of the LPE because an adversary cannot discover the value of the LPE even if the adversary were to gain physical possession of token 315.

In one embodiment, token 315 may provide the following functions and makes these functions available to be called by software that executes on client device 310:

generateLPE(OUT: Boolean): generateLPE may use a random number generator on token 315 to generate a new LPE value and returns TRUE if and only if the operation succeeds. Token 315 may retain this value until it either receives another generateLPE request. The user may request to remove the stored value by invoking generatingLPE again thereby overriding the value calculated on the previous generateLPE invocation.

initialize(IN:g, IN:p): Initialize token 315 with values "g" and "p" to be used in subsequent calculations. Token 315 may retain these values until overwritten in a subsequent initialize call. Using means known to those in the art, token 315 validates "reasonableness" of the values "g" and "p". For example, the values "g" and "p" must have suitable lengths to ensure cryptographic validity. In one embodiment, token 315 does not include the initialize function. Instead, the user receives token 315 with pre-initialized values. The user must ensure that he or she receives token 315 from a trusted source.

calculateA(IN:password, OUT:A): Accept a password string as an IN parameter. Combine the password with the LPE and calculate the value "A" using the methods described above. In one embodiment the combination is a concatenation. In another embodiment is SHA256 (password, LPE).

calculateK(IN:password,IN:B,OUT:K): Accept a password and value "B", and return the calculated value "K" using the methods described above. Provide the value "K" as an OUT parameter to client device 310.

Despite the fact that the user or client device 310 cannot discover the value of the LPE when the LPE is stored on the cryptographically-enhanced USB token, the system 300 is complete. The user may execute all the steps of FIG. 1 to calculate and register a value "A". Subsequently, the user may execute all steps of FIG. 3 to login.

In another embodiment, the cyrptograpically enhanced USB token contains an input channel that allows the user to enter his or her password directly onto token 315. In other words calculateA and calculateK both receive the password directly from the user without allowing client device 310 access to the password.

In another embodiment, token 315 may contain an asymmetric private key suitable for creating digital signatures. Token 315 contains no interface that allows the private key to be exported off token 315. In another embodiment, the private key may be exported off token 315, but only to trusted media suitably protected with cryptography to protect against unauthorized key leakage.

Token 315 may execute cryptographic processing using this private key. For example, when presented with string, S, as an input parameter, token 315 may apply its private key to create the digital signature of S. Example algorithms used to create digital signatures are RSA using 2048 bit keys and elliptical curves. In this embodiment, token 315's implementation of calculateK does not return the value "K" to client device 310. Instead, calculateK retains the value "K" on token 315. Token 315 includes the function sign:

sign(IN: bitsequence,OUT:encrypted-signature): The sign function accepts a sequence of bits as input, and uses the private key stored on token 315 to digitally sign those bits. Then, token 315 may encrypt the signature using the value "K". Token 315 returns as output to client device 310 the encrypted signature.

In another embodiment, token 315 may include the following additional function signK:

signK(IN:bitsequence,OUT:encrypted-signature):

The signK function operates in exactly the same manner as sign with one exception. The signK function digitally signs the following value:

SHA-256(SHA-256(K),SHA-256(bitsequence))

Using out of band-methods, the client and server decide whether the client should produce signatures using the sign( ) function or the signK( ) function. If using the signK( ) function. The server only accepts a digital signature from the client if the client signed using a correctly negotiated value "K". This mechanism precludes the possibility of a man-in-the-middle attack.

This embodiment has the property that token 315 may be used to digitally sign messages. The digital signature, however, may only be validated by a recipient who was able to validate the user's password. That is, if the recipient did not know the value "A", then the recipient could not calculate the correct value "K". If the recipient cannot calculate "K", then the recipient cannot validate the digital signature. If the client uses the sign function, then the server can produce no audit log proving receipt of a signature that the server can decrypt.

Examples of the use of digital signatures are provided in U.S. Pat. No. 6,170,058, the disclosure of which is incorporated by reference in its entirety.

In another embodiment, other suitable technologies may be used in place of a USB interface. For example, wireless technology such as Bluetooth, WiFi, Near Field Communication and other RF technologies, IR, optical scanning, QR codes, bar codes, audio, etc. may be used as necessary and/or desired. In another embodiment, token 315 may be a SIM card.

In one embodiment, token 315 may be used to authenticate the user. In one embodiment, token 315 may be checked at any point during the login process. In another embodiment, token 315 may be checked during the transaction. This may be used to provide additional security for the user.

Figure 5:
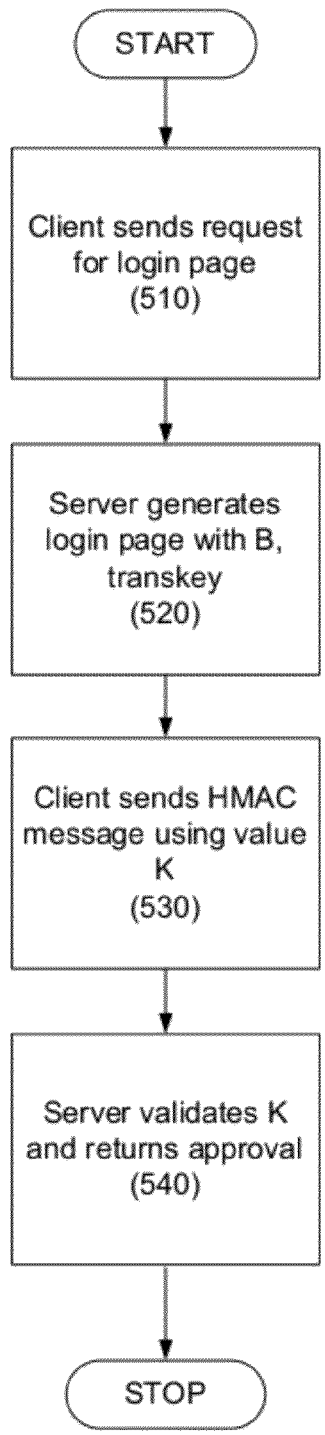
FIG. 5 is a flowchart depicting a method for end-to-end encryption according to one embodiment of the invention.

Referring to FIG. 5, a simplified login process according to one embodiment is disclosed. In step 510, the client may send a request for a login page to the server. This may be similar to step 350, above.

In step 520, the server may generate a login page that is provided to the client. This may be similar to step 355, above.

In step 530, the client may calculate a HMAC of the message (K, UserID, Transkey, and OTP) to the server. This may be similar to step 365, above.

In step 540, the server may validate K and transmit an approval to the client if appropriate. This may be similar to step 380, above.

Although the disclosure is in the context of a logon process, the invention is not so limited. The registration process and authentication process has many uses, including, for example, accessing financial accounts, accessing secure workspaces, executing commands, verifying an identity, etc.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

I claim:

1. A method for user authentication, comprising:
   at least one computer processor receiving a login page from a server, the login page including a value B, wherein the value B is defined as:

$$B = g^b \bmod p$$

where b is an arbitrary number, g is a primitive root, and p is a prime number;
   sending a Hash-based Message Authentication Code to the server; and
   receiving an authentication from the server;
   wherein the Hash-based Message Authentication Code comprises HMAC(K,(UserID, encrypted value b, OTP));
   wherein K is equal to $B^a \bmod p$, and a is a concatenation of a password and a password extension; and
   wherein the UserID is a user identifier; and
   wherein the OTP is a one-time password.

2. The method of claim 1, wherein the arbitrary number is a random number.

3. The method of claim 1, wherein the arbitrary number is a pseudo-random number.

4. A method for user authentication, comprising:
   at least one computer processor receiving a login page from a server, the login page including a value B, wherein the value B is defined as:

$$B = g^b \bmod p$$

where b is an arbitrary number, g is a primitive root, and p is a prime number;
   sending a Hash-based Message Authentication Code to the server; and
   receiving an authentication from the server;
   the at least one computer processor verifying the authenticity of the server, comprising:
     receiving a server value RESP from the server, the server value RESP equal to HMAC(K,(UserID, encrypted value b, OTP, timestamp+1));
     using the computer processor, calculating a client value RESP equal to HMAC(K,(UserID, encrypted value b, OTP, timestamp+1)); and
     verifying that the server value RESP against the client value RESP.

5. The method of claim 4, wherein the arbitrary number is a random number.

6. The method of claim 4, wherein the arbitrary number is a pseudo-random number.

7. A method for user authentication, comprising:
   a server comprising at least one computer processor generating a value B, wherein the value B is defined as:

$$B = g1^b \bmod p1$$

where b is an arbitrary number, g1 is a first primitive root, and p1 is a first prime number;
   the server generating a login page containing the value B;
   the server providing the login page to a client device;
   the server receiving a Hash-based Message Authentication Code from the client device, the Hash-based Message Authentication Code comprising a UserID and a one-time password;
   retrieving a stored cryptographic public information and a stored one-time password associated with the UserID;
   using the computer processor, the server determining a client value K; and
   using the computer processor, the server validating the client value K against a server value K;
   wherein the Hash-based Message Authentication Code comprises HMAC(K,(UserID, encrypted value b, one-time password));
   wherein K is equal to $B^a \bmod p2$, a is a concatenation of a password and a password extension, and p2 is a second prime number; and
   wherein the UserID is a user identifier.

8. The method of claim 7, wherein the server rejects the authentication request if the server does not validate the value K.

9. The method of claim 7, wherein the server does receive a user password.

10. The method of claim 7, further comprising:
    a second server receiving the Hash-based Message Authentication Code from the client device, the Hash-based Message Authentication Code comprising a UserID and a one-time password;
    the second server retrieving a second stored cryptographic public information and a stored one-time password associated with the UserID;
    using the computer processor, the second server determining a second client value K; and
    using the computer processor, the second server validating the second client value K against a second server value K.

11. The method for user authentication of claim 7, wherein the value for p1 and p2 are equal.

12. The method of claim 7, wherein the arbitrary number is a random number.

13. The method of claim 7, wherein the arbitrary number is a pseudo-random number.

14. A method for user authentication, comprising:
    a server comprising at least one computer processor generating a value B, wherein the value B is defined as:

$$B = g1^b \bmod p1$$

where b is an arbitrary number, g1 is a first primitive root, and p1 is a first prime number;
    the server generating a login page containing the value B;
    the server providing the login page to a client device;
    the server receiving a Hash-based Message Authentication Code from the client device, the Hash-based Message Authentication Code comprising a UserID and a one-time password;
    retrieving a stored cryptographic public information and a stored one-time password associated with the UserID;
    using the computer processor, the server determining a client value K; and
    using the computer processor, the server validating the client value K against a server value K;
    wherein the server determines the client value K from using the equation $K = B^a \bmod p2$, a is a concatenation of a password and a password extension, and p2 is a second prime number.

15. The method for user authentication of claim 14, wherein the value for p1 and p2 are equal.

16. The method of claim 14, wherein the arbitrary number is a random number.

17. The method of claim 14, wherein the arbitrary number is a pseudo-random number.

18. A method for user authentication, comprising:

a server comprising at least one computer processor generating a value B, wherein the value B is defined as:

$$B = g^b \bmod p$$

where "b" is an arbitrary number, "g" is a primitive root, and "p" is a prime number;

the server generating a login page containing the value "B";

the server providing the login page to a client device;

the server receiving, from the client device, a UserID, a one-time password, and a Hash-based Message Authentication Code;

the server retrieving a value "A" based on the UserID;

the server calculating a server value K, the server value K equal to $A^b \bmod p$, the server calculating a client value K equal to $B^a \bmod p$, wherein "a" is a concatenation of a password and a password extension; and the server validating the client value K against a server value K.

19. The method of claim 18, wherein a second UserID is associated with a second prime number "p2."

20. The method of claim 18, wherein the arbitrary number is a random number.

21. The method of claim 18, wherein the arbitrary number is a pseudo-random number.

\* \* \* \* \*